United States Patent
Xiao

(10) Patent No.: US 11,998,966 B2
(45) Date of Patent: Jun. 4, 2024

(54) METHOD FOR MITIGATING THE EFFECTS OF COIL COLLAPSE ON HOT STRIP MILL COILS

(71) Applicant: ARCELORMITTAL, Luxembourg (LU)

(72) Inventor: Yuefa Xiao, Tinley Park, IL (US)

(73) Assignee: ArcelorMittal, Luxembourg (LU)

( * ) Notice: Subject to any disclaimer, the term of this patent is extended or adjusted under 35 U.S.C. 154(b) by 502 days.

(21) Appl. No.: 17/044,411

(22) PCT Filed: Mar. 29, 2019

(86) PCT No.: PCT/IB2019/052600
§ 371 (c)(1),
(2) Date: Oct. 1, 2020

(87) PCT Pub. No.: WO2019/193474
PCT Pub. Date: Oct. 10, 2019

(65) Prior Publication Data
US 2021/0114073 A1    Apr. 22, 2021

(30) Foreign Application Priority Data
Apr. 4, 2018 (WO) .................. PCT/IB2018/052328

(51) Int. Cl.
*B21C 47/04* (2006.01)
*B21C 47/24* (2006.01)
*C21D 9/52* (2006.01)

(52) U.S. Cl.
CPC .............. *B21C 47/04* (2013.01); *B21C 47/24* (2013.01); *C21D 9/52* (2013.01)

(58) Field of Classification Search
CPC ....... B21C 47/02; B21C 47/04; B21C 47/063; B21C 47/08; B21C 47/24
(Continued)

(56) References Cited

U.S. PATENT DOCUMENTS

| 4,271,959 A * | 6/1981 | Eibe ...................... B65G 25/06 242/533.3 |
| 4,407,407 A | 10/1983 | Eibe et al. |
| 2012/0026708 A1* | 10/2012 | Ohara ..................... B21C 51/00 72/19.7 |

FOREIGN PATENT DOCUMENTS

| CN | 1506174 A | 6/2004 |
| CN | 102335681 A | 2/2012 |

(Continued)

OTHER PUBLICATIONS

International Search Report of PCT/IB2019/052600, dated Aug. 27, 2019.

*Primary Examiner* — Debra M Sullivan
*Assistant Examiner* — Matthew Stephens
(74) *Attorney, Agent, or Firm* — Davidson Kappel LLC

(57) ABSTRACT

A method for mitigating the effects of coil collapse on hot strip mill coils. A hot strip coil is removed from the mandrel/downcoiler and pre-sagged to create an initial sag by allowing gravity cause the coil to sag in a first specific direction for a first period of time. Then, without coil eye support to limit sagging, the direction of the sag caused by the force of gravity is modified to a direction perpendicular to the first specific direction and gravity is allowed to sag said coil for a second period of time. The first period of time and the second period of time are chosen such that the initial sag created during the first period of time is substantially mitigated by the perpendicular sag during the second period of time. The hot strip coil being cooled enough by the end of the second period of time such that the rate of sagging of the hot strip coil has become negligible.

12 Claims, 6 Drawing Sheets

(58) Field of Classification Search
USPC .......................................................... 72/148
See application file for complete search history.

(56) References Cited

FOREIGN PATENT DOCUMENTS

| | | | | |
|---|---|---|---|---|
| FR | 2751299 A1 * | 1/1998 | ............. | B65B 27/06 |
| JP | 2005 219076 A | 8/2005 | | |
| JP | 2010-207836 A | 9/2010 | | |
| JP | 2010207836 A * | 9/2010 | ............. | B21C 47/24 |
| KR | 20120032974 A * | 4/2012 | ............. | B21C 47/30 |
| KR | 20120121801 A | 11/2012 | | |
| KR | 101257391 B1 | 4/2013 | | |
| KR | 101368272 B1 * | 2/2014 | ............. | B21C 47/24 |
| KR | 101420629 B1 * | 7/2014 | ............. | B21C 47/24 |
| KR | 101420629 B1 | 7/2014 | | |
| KR | 101504837 B1 * | 3/2015 | ............. | B21C 47/24 |

* cited by examiner

US 11,998,966 B2

METHOD FOR MITIGATING THE EFFECTS OF COIL COLLAPSE ON HOT STRIP MILL COILS

FIELD OF THE INVENTION

The present invention relates generally to steel hot rolling mills. More specifically the invention relates to coils of hot rolled steel and most specifically to prevention/mitigation of coil collapse of hot rolled steel coils.

BACKGROUND

Hot strip mills are provided with two or sometimes three coilers, each of which in turn coils the hot strip from the mill into a coil and delivers the coil onto a conveyor which carries it away from the mill and allows the hot coil of strip to cool to a temperature at which the coil may be handled without damage. The strip is, of course, coiled on a horizontal mandrel and conventionally the hot coils had been turned 90 degree or "down-ended", as it is called, so as to be conveyed with the hole or the coil eye vertical. This has been done because hot coils set down on a flat surface with the eye horizontal tend to sag and become egg-shaped. The strip when hot does not have enough strength to support itself in this position. Coil sagging occurs during and after hot coiling and is due to a relative displacement of the coil wraps leading to a reduction of the coil inner (coil eye) diameter after the coil is removed from the mandrel. FIG. 1 is a schematic depiction of a collapsed coil 1. Specifically, the coil eye 2 can be seen to be oval in shape having a maximum diameter $D_{max}$ and a minimum diameter $D_{min}$. The present inventors use the following coil sagging criteria to determine when a coil has sagged beyond acceptable limits: 1) $D_{min}$ is too small (eg.: For a 760 mm I.D. coil, $D_{min}<710$ mm), or; 2) the difference between $D_{max}$ and $D_{min}$ is too large (for example: >20-30 mm).

However, there is a considerable disadvantage in delivering hot coils in the eye vertical position. The successive wraps or turns of hot strip are never coiled with their edges accurately in line and protruding wraps or turns on the lower end of the coil are damaged when the hot coil is down-ended. The coil must, therefore, be trimmed, resulting in a considerable scrap loss.

Recently, to avoid this loss, attention has been directed to means for conveying hot coils with the eye horizontal. Apparatus has been engineered to carry hot coils in V-shaped supporting means. In such apparatus, the coils are supported essentially along two lines of contact, and coil sag is less than it is when the coil is supported only on a bottom line of contact. An optimum angle of the V-shaped conveyor pallets, mathematically determined, has been proposed which minimizes the coil collapse. However, the coil will still sag a certain amount which depends on several factors but mainly tightness and temperature. A tightly wound coil will not sag appreciably if it can be kept tight during transfer. Many coils, however, will loosen up when stripped off the downcoiler mandrel, even when banded as soon as possible. Weight of coil, degree of looseness and temperature will then determine the amount of sagging when the coil rests on its circumferential surface. Continuous rotating or rolling of the coil as it cools can equalize the coil sagging. However, coil rolling is not favored in the industry since it tends to damage the outer turns and also further loosen the coil.

One prior art solution to this problem is disclosed in U.S. Pat. Nos. 4,271,959 and 4,407,407. These patents relate to a walking beam type coil rotating cooling conveyor system. The apparatus works by transferring each coil from station to station along the conveyor in a path normal to the coil axes. Each coil is caused to rotate about its axis through an angle during this transfer, but without rolling, so that the coil is supported on successive regions of its outside wrap as it moves along the conveyor, thus equalizing the tendency to sag and preserving circularity of the coil. The length of the conveyor needed to be long enough to allow the coil to cool to a safe temperature. Unfortunately, this conveyor system is expensive to build and maintain and has not been implemented in steel plants around the world.

Another prior art solution is present in Korean patent KR 101420629 B1 (WOO WON MI [KR]) 18 Jul. 2014. The method allows the coil eye to pre-sag after being removed from the mandrel. However, when the coil is turned to change the direction of force thereon, the method of the '629 patent calls for the insertion of a mechanical device into the coileye to physically prevent the coil from sagging beyond the circular state back to an oval state. The present invention does not need nor use this mechanical device to physically limit the re-sagging of the coil.

Another prior art solution is present in Korean published patent application KR 20120121801 A (HYUNDAI STEEL CO) 6 Nov. 2012. The '801 application relates to a hot-rolled coil shape correcting apparatus, and more particularly, to a hot rolled coil shape correcting apparatus for preventing and correcting deformation of a hot-rolled coil caused by its own load during storage. The apparatus comprises calibrating roller which mechanically press the sagged coil into a circular shape.

Yet another prior art solution is present in Japanese published patent application JP 2005 219076 A (SUMITOMO METAL IND) 18 Aug. 2005. The '076 application disclosed a cradle for the coil specifically designed to prevent sagging of coils.

There is still needed in the art a simple and inexpensive method/apparatus to avoid or mitigate coil sagging issues related to hot strip mill hot band coils, without inserting a mechanical means into the coil eye to limit sagging.

SUMMARY OF THE INVENTION

The present invention provides for a method for mitigating the effects of coil collapse on hot strip mill coils, without the insertion of mechanical means into the coil eye to limit sagging. The method includes producing a hot rolled steel sheet in a hot strip mill and forming a hot strip coil by coiling the hot rolled steel sheet around a mandrel on a downcoiler. The downcoiler orienting the hot strip coil such that the coil eye axis thereof is in the horizontal direction. Next the hot strip coil is removed from the mandrel/downcoiler. The hot strip coil is then pre-sagged to create an initial sag by allowing gravity to cause the coil to sag in a first specific direction for a first period of time. Then, without inserting a mechanical means into the coil eye to limit sagging, the direction of the sag caused by the force of gravity is modified to a direction perpendicular to the first specific direction which allows gravity to sag the hot strip coil in the modified direction for a second period of time. The first and second periods of time are chosen such that the initial sag created during the first period of time is substantially mitigated by the perpendicular sag during the second period of time, and the hot strip coil is cooled enough by the end of the second period of time such that the rate of sagging of the hot strip coil has become negligible. It should be noted that no physical means of mechanical support is inserted into the coileye to prevent or stop the sagging of the coil. That is, unlike the method of KR101420629 B1, once the pre-sagged coil is turned and allowed to sag during the second time period, no means of mechanical support is inserted into the coileye to prevent the coil from re-sagging past the symmetrically circular state. The timing of the coil turn is such that the coil will not re-collapse into an oval again without any need for mechanical support.

The step of pre-sagging the hot strip coil may comprise the steps of placing the hot strip coil onto a coil car which may have a coil stand to hold and support the coil resting on its bottom. The hot strip coil is then held, without rotation about said coil eye axis, for the first period of time. The first period of time may be between 1 and 6 minutes. Preferably the first period of time may be between 2 and 6 minutes and more preferably between 2.5 and 4.5 minutes. This pre-sagging creates a maximum coil eye diameter ($D_{max}$) dimension in the direction perpendicular to the force of gravity.

The step of modifying the direction of the sag caused by the force of gravity to a direction perpendicular to said first specific direction may include rotating the hot strip coil upon its coil eye axis by an angle of $=Z \times 90$ degrees, wherein Z is an odd integer of 1 or greater. This rotates the maximum coil axis dimension ($D_{max}$) to a direction parallel to the force of gravity. Then the hot strip coil is held, without additional rotation about its coil eye axis, for the second period of time, which lasts until the rate of sagging of the hot strip coil is negligible and the initial sag is substantially mitigated.

After the step of rotating the hot strip coil, it may then be placed onto a conveyor and transported to another destination after said step of rotating said hot strip coil. The other destination may be a holding yard.

The step of producing a hot rolled steel sheet in a hot strip mill may include the steps of providing a steel slab, reheating the steel slab, descaling the steel slab, edging the steel slab, roughing the steel slab, and hot rolling the hot rolled steel strip.

The step of pre-sagging the hot strip coil to create an initial sag may include the step of banding the hot strip coil with band strips during the step of holding the hot strip coil, without rotation about the coil eye axis. The coil car may include a set of rollers to implement the step of rotating the hot strip coil upon its coil eye axis. Each roller of the set of rollers may include notches to accommodate the banding strips, thereby preventing the banding strips from being compressed between the hot strip coil and the rollers.

Alternatively, the step of pre-sagging the hot strip coil may include placing the hot strip coil onto a support positioned within the coil eye which hangs by its coil eye from the support. The hot strip coil hangs, without rotation about its coil eye axis, for the first period of time, which may be between 1 and 6 minutes. This pre-sagging creates a maximum coil eye diameter ($D_{max}$) dimension in the direction parallel to the force of gravity.

The step of modifying the direction of the sag caused by the force of gravity to a direction perpendicular to the first specific direction may include placing the hot strip coil onto its bottom; and resting the hot strip coil on its bottom for the second period of time. The second period of time lasting until the rate of sagging of the hot strip coil is negligible and the initial sag is substantially mitigated.

DETAILED DESCRIPTION OF THE INVENTION

The present invention relates to a method and apparatus for mitigating or eliminating coil sag in hot band coils without inserting a mechanical means into the coil eye to limit sagging. Coil sagging occurs during and after hot coiling and is due to relative displacement of the coil wraps leading to a reduction of the coil inner (coil eye) diameter after the coil is removed from the mandrel. Hot band coil collapse/coil sagging results in additional manufacturing cost due to 1) the inability to load a collapsed coil onto pickling line mandrel, requiring reprocessing of the coil; and 2) wobbling of coil during subsequent uncoiling, resulting in strip steering issues, lower pickling line productivity and even equipment damage. The issues with coil collapse are increasing with newer high strength steels and will continue to do so.

Figure 1:
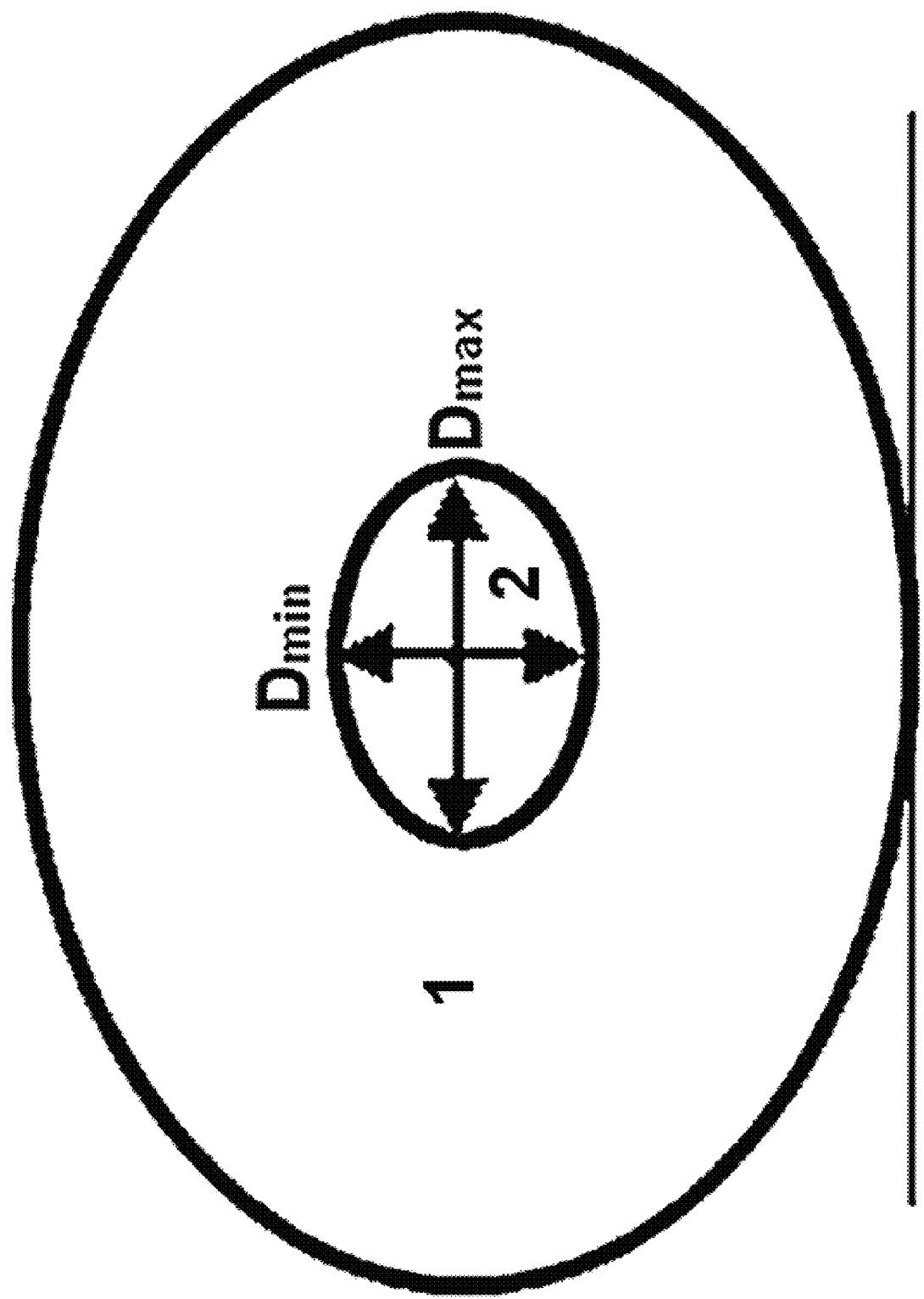
FIG. 1 is a schematic depiction of a collapsed coil.
Figure 2:
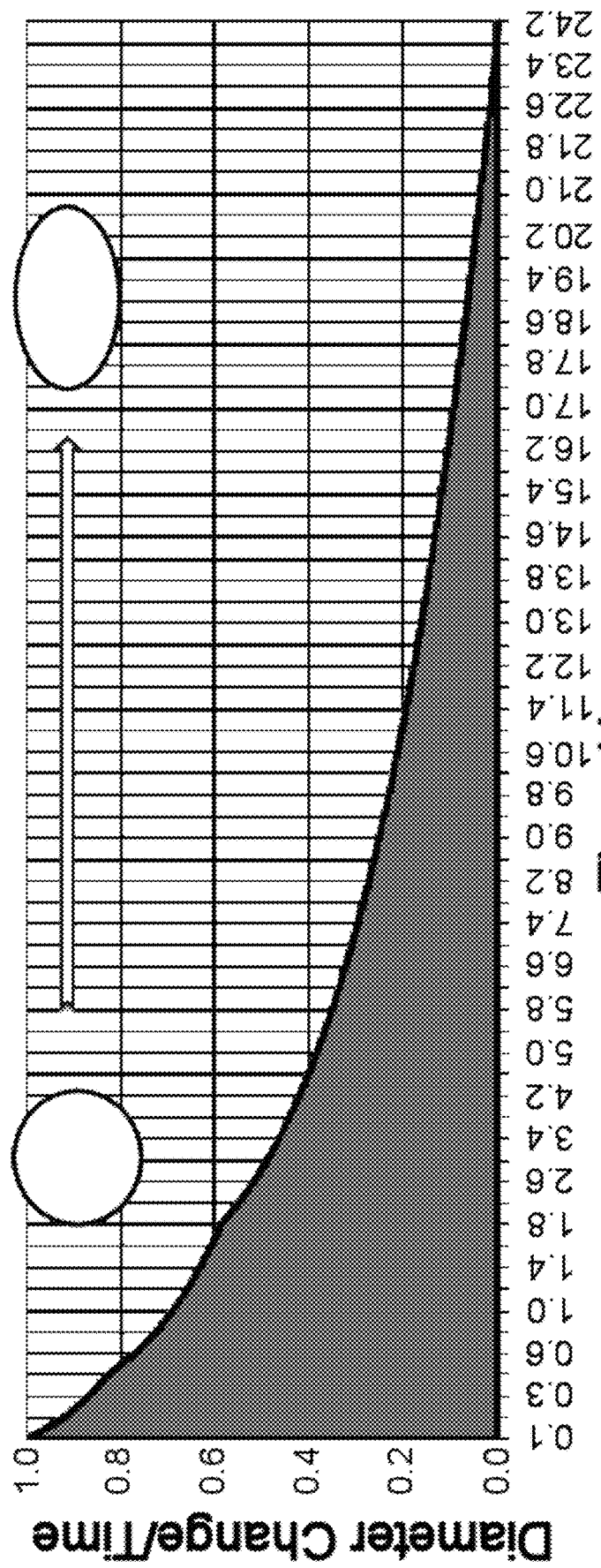
FIG. 2 is a graphical depiction of the normal coil sagging rate the over time.

Sagging rate is defined as the change in the diffidence between maximum and minimum coil diameters over time. Sagging starts at the coiler and sagging rate is higher at the begin and could last for 24 hours. FIG. 2 is a graphical depiction of the normal coil sagging rate the over time. The graph plots the diameter change rate vs time in hours. In the beginning the coil is hot and the sagging rate is quite high. As time progresses, the sagging rate decreases as the coil cools. Eventually the sagging rate falls to near zero, but by that time the coil has collapsed significantly and is likely to have to be reprocessed to be useful. This reprocessing usually entails recoiling of the band to try to remove the shape eccentricities.

Figure 3:
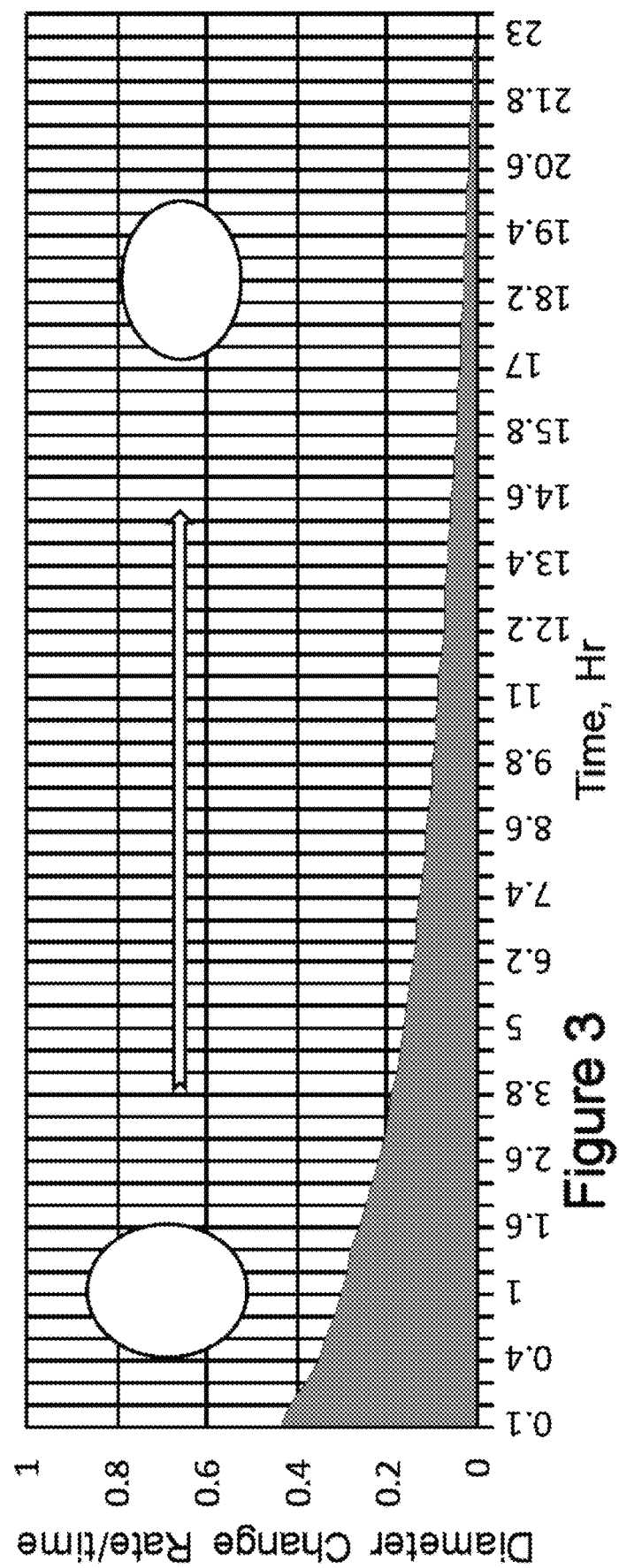
FIG. 3 is a schematic diagram that shows what happens to a coil which is oval in shape at the beginning of the cooling period with the large axis parallel to the force of gravity.

In studying the issue of coil collapse, the present inventor has noted that (as in FIG. 2) when the coil is round at the beginning of the coil collapse (hot coil) period, the final coil will be oval shaped with its major axis perpendicular to the force of gravity. It was also noticed (as shown in FIG. 3) that if the coil was oval in shape at the beginning of the cooling period with the large axis parallel to the force of gravity, the coil would collapse to the point that the larger axis shifted to perpendicular to the force of gravity again.

Figure 4:
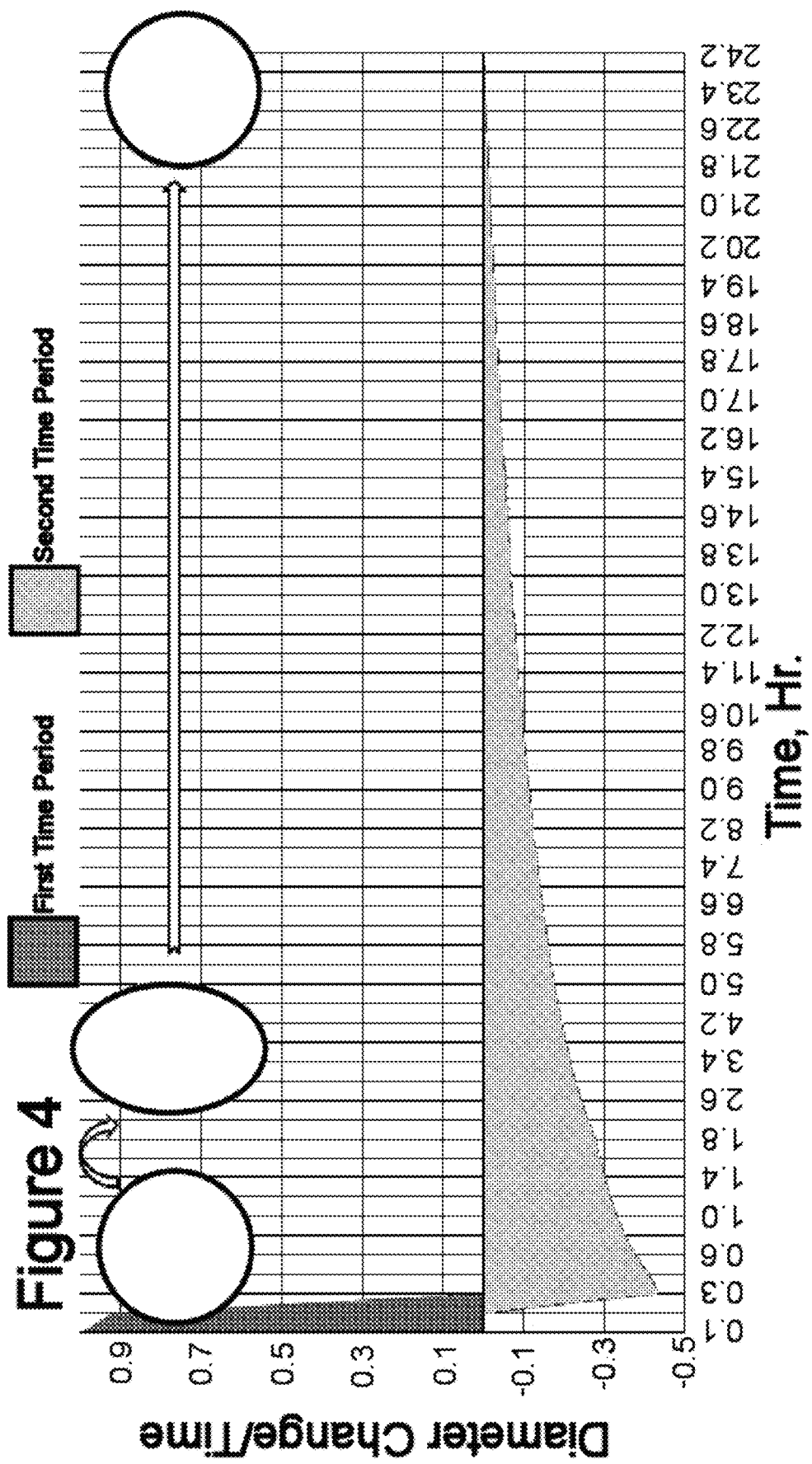
FIG. 4 is a schematic diagram that depicts the results of inventive process.

It was then that the inventor discovered that there was a particular range of time in the cooling curve that a coil, which has begun to collapse, can be rotated 90 degrees (or some odd multiple of 90 degrees, such as 270 degrees) and as it continues to cool, the collapse can mitigate or eliminate the effects of coil eye collapse. That is, the coil is initially allowed to collapse, and after a specific period of cooling/collapsing time, the coil is rotated such that the larger axis is shifted from perpendicular to the force of gravity to parallel to the force of gravity. Then, without inserting a mechanical means into the coil eye to limit sagging, the coil is allowed to further cool/collapse, such that the difference between the maximum and minimum coil eye diameters is negligibly small. That is, the difference between the maximum and minimum coil eye diameter is small enough that the coil can be properly used in later processes without the need to be recoiled or scrapped. FIG. 4 depicts a first embodiment of the inventive process, wherein the initially round coil collapses for a first period of time (weave pattern), is rotated and allowed to finish collapsing for a second period of time (dither pattern) and ends up relatively round again. It should be noted that on each of FIGS. 2-4 there is a depiction of coil shape transformation, however, this is just for illustrative purposes only and the position of the shapes along the time line is not indicative of the time of shape transformation.

The present inventor has discovered that the time of initial cooling/collapse (after removal from the coiling mandrel) should be between 1 and 6 minutes. After the initial cooling/collapse time, the coil is rotated such that the diameter dimension of the coil that was perpendicular to the force of gravity is now parallel to the force of gravity. That is, the coil is rotated 90 degrees or some odd multiple of 90 degrees (270, 450, etc. degrees). The equipment needed to perform the rotation is a set of rollers. The rollers may have grooves cut circumferentially therein to allow for placement of the coil banding strips therein. Thus, the capital investment for the equipment is quite small.

The process of the present invention relates to the production of coils of hot rolled sheet. Thus, the first step is production of hot rolled steel sheet in a hot strip mill. Generally, such a process includes reheating a steel slab, descaling the slab, edging the slab, roughing the slab and then rolling the strip. Then the rolled hot strip is coiled by a downcoiler around a mandrel. The hot rolled steel sheets are conventionally coiled at relatively lower temperatures to allow for the transition from Austenite to Martensite before the coil is removed from the mandrel to prevent excess sagging. In the method of the instant invention, the steel may be coiled at higher temperatures than conventionally used because the transition can be allowed to occur after the coil is removed from the mandrel and any sagging will be compensated for by the present method. The coil has its coil eye axis in the horizontal direction. The coil is then removed from the mandrel/downcoiler by a coil car. The coil is then held without rotation about the coil eye axis for a first hold time of between 1 and 6 minutes. More preferably the first hold time is between 2 to 6 minutes and most preferably between 2.5 to 4.5 minutes. While being held, the coil may optionally be banded and is thereafter placed on a set of rolls. The hold time begins the moment the coil is removed from the mandel. This hold time creates an initial sagging of the coil (a pre-sag) and creates a maximum coil eye diameter ($D_{max}$) dimension in the direction perpendicular to the force of gravity. After the hold time, the coil is then rotated upon its coil eye axis via the set of rolls. The coil is rotated Z×90 degrees, wherein Z is an odd integer of 1 or greater, thereby rotating said maximum coil axis dimension ($D_{max}$) to a direction parallel to the force of gravity. The coil is then held for a second period of time without additional rotation and without any means of mechanical support being inserted into the coileye to prevent the coil from re-sagging past the symmetrically circular state. The second period of time last until the rate of sagging of the coil is negligible, thereby offsetting or substantially mitigating the initial sagging (pre-sag). The initial sag is substantially mitigated when the coil is useable for further processing or sale without having to be recoiled. The rate of sagging is negligible when any further sagging will not affect the coil to the point that the coil would need to be recoiled to be useable. After rotating the coil, it may be placed onto a conveyor and transported to another destination, such as a holding yard.

As used herein, collapse/collapsing and sag/sagging are used interchangeably for the same concept.

Example

Examples of coils/coiling both with and without the first embodiment of the method of the present invention are shown in Table 1. The steel alloy of the coils has the following nominal composition in wt. %: C: 0.07-0.25, Mn: 1.5-2.5, Cr: 0-0.3, S: 0.-0.3, Mo: 0-0.3, Nb: 0-0.03, B: 0-0.0030, Ti: 0.-0.05 and the remainder Fe and inevitable impurities.

TABLE 1

| | | 2.0-2.5 | 2.6-3.0 | 3.1-3.5 | 3.6-4.0 | 4.1-4.5 | 4.6-5.0 | total |
|---|---|---|---|---|---|---|---|---|
| 1 | Gauge range of coils, mm | | | | | | | |
| 2 | Number of coils produced without inventive method | 2 | 58 | 341 | 96 | 69 | 73 | 639 |
| 3 | Number of sagging coils without inventive method | 2 | 50 | 243 | 59 | 27 | 20 | 401 |
| 4 | sagging rate in % without inventive method | 100.0% | 86.2% | 71.3% | 61.5% | 39.1% | 27.4% | 62.8% |
| 5 | Average Sagging of coils without inventive method, mm | 30.0 | 37.1 | 37.0 | 25.2 | 29.8 | 21.3 | 33.2 |
| 6 | Number of coils produced with inventive method | 3 | 9 | 224 | 185 | 65 | 24 | 510 |
| 7 | Number of sagging coils with inventive method | 0 | 1 | 31 | 5 | 0 | 0 | 37 |
| 8 | sagging rate in % with inventive method | 0.0% | 11.1% | 13.8% | 2.7% | 0.0% | 0.0% | 7.3% |
| 9 | Average Sagging of coils with inventive method, mm | 15.0 | 16.3 | 22.5 | 18.5 | 17.3 | 13.3 | 19.8 |

The first row of Table 1 indicates the gauge range of the steel strip comprising the coils. The second row is the number of coils in a particular gauge range produced without the method of the present invention. The third row is the number of coils from row two that sagged without inventive method. The fourth row is the percentages of coils from row two that sagged (i.e. the number of coils in row 3 divided by the number of coils in row 2 times 100). The fifth row shows the average sagging (in mm) of coils without inventive method.

The sixth row of Table 1 indicates the number of coils in a particular gauge range produced with the method of the present invention. The seventh row is the number of coils from row six that sagged with inventive method. The eighth row is the percentages of coils from row six that sagged (i.e. the number of coils in row 7 divided by the number of coils in row 6 times 100). The ninth row shows the average sagging (in mm) of coils with inventive method.

As can be seen, the method of the present invention reduces the number/percentage of coils that have deleterious sagging throughout all gauge ranges investigated. Averaging all of the coils tested, the coil collapse sagging rate in percent was reduced from 62.8% down to 7.3%. Thus increasing yield and saving money by reducing scrap/downgraded coils.

Generically, the invention can be described as allowing a hot coil to pre-sag for a period of time under the influence of gravity and then modifying the direction of the force of gravity on the coil to allow the coil to further sag in such a manner as to offset or mitigate the pre-sag, returning the coil to a relatively circular shape.

Figure 5:
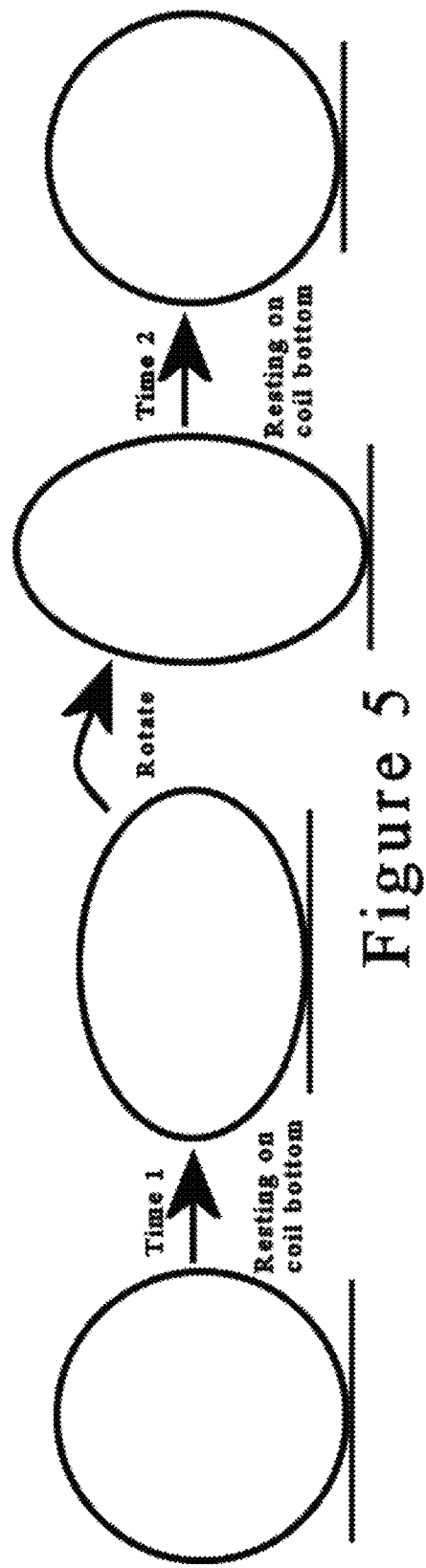
FIG. 5 is a simplified depiction of a first embodiment of the method of the present invention.

FIG. 5 is a simplified depiction of a first embodiment of the present invention. The steel coil is circular when removed from the coiling mandrel, it is allowed to rest on its coil bottom and pre-sag for a period of time designated Time 1. After Time 1, the coil is rotated Z×90 degrees, wherein Z is an odd integer of 1 or greater and the coil is again allowed to rest on its coil bottom to sag for a second period of time, designated Time 2. After this second period of time, the coil has sagged enough to counteract the pre-sag and is once again in a relatively circular shape.

Figure 6:
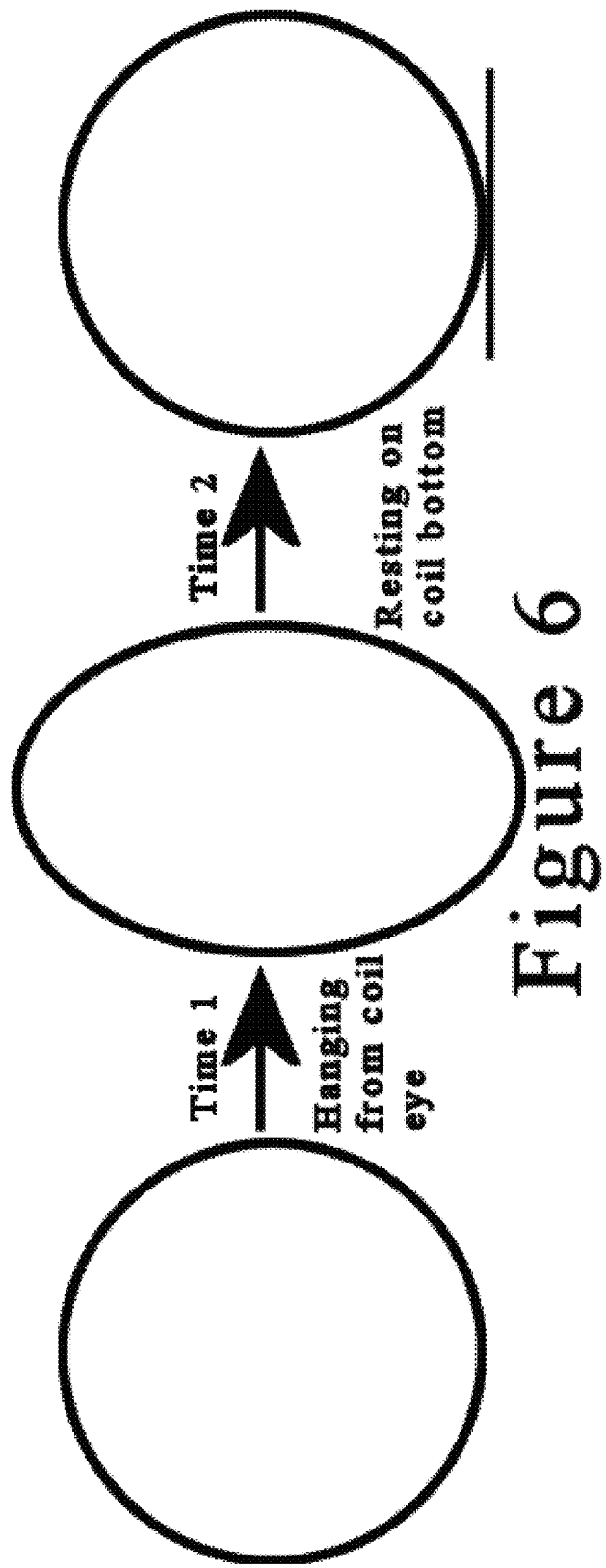
FIG. 6 is a simplified depiction of a second embodiment of the method of the present invention.

FIG. 6 is a simplified depiction of the second embodiment of the present invention. The steel coil is circular when removed from the mandrel, it is allowed to hang from a support in the coil eye and pre-sag for a period of time designated Time 1. After Time 1, the coil is allowed to rest on its coil bottom and continue sagging for a second period of time, designated Time 2. After this second period of time, the coil has sagged enough to counteract the pre-sag and is once again in a relatively circular shape.

What is claimed is:

1. A method for mitigating the effects of coil collapse on hot strip mill coils without insertion of a mechanical means into the coil eye to limit sagging, the method comprising the steps of:
   producing a hot rolled steel sheet in a hot strip mill;
   forming a hot strip coil by coiling the hot rolled steel sheet around a mandrel on a downcoiler;
   orienting the hot strip coil such that the coil eye axis of the hot strip coil is in a horizontal direction;
   removing the hot strip coil from the mandrel/downcoiler;
   pre-sagging the hot strip coil to create an initial sag by allowing gravity to cause the coil to sag in a first specific direction for a first period of time, thereby causing the coil to become pre-sagged;
   without inserting a mechanical means into the coil eye to limit sagging, modifying a direction of the sag caused by the force of gravity to a direction perpendicular to the first specific direction and allowing gravity to sag the coil in the modified direction for a second period of time;
   wherein the hot strip coil being cooled enough by the end of the second period of time such that the rate of sagging of the hot strip coil has become negligible;
   wherein the step of pre-sagging the hot strip coil includes the steps of:
   placing the hot strip coil onto a coil car, the coil car having a coil stand to hold and support the coil, the coil resting on a coil bottom;
   holding the hot strip coil, without rotation about said coil eye axis, for the first period of time, wherein the first period of time is between 1 and 6 minutes, the pre-sagging creating a maximum coil eye diameter ($D_{max}$) dimension in the direction perpendicular to the force of gravity.

2. The method as recited in claim 1 wherein the step of modifying the direction of the sag caused by the force of gravity to a direction perpendicular to the first specific direction includes the steps of:
   rotating the hot strip coil about the coil eye axis by an angle of Z×90 degrees, wherein Z is an odd integer of 1 or greater; thereby rotating the maximum coil axis dimension ($D_{max}$) to a direction parallel to the force of gravity;
   holding the hot strip coil, without additional rotation about the coil eye axis, for the second period of time, the second period of time lasting until the rate of sagging of said hot strip coil is negligible and the initial sag is mitigated.

3. The method as recited in claim 2 further comprising the steps of:
   placing the hot strip coil onto a conveyor; and
   transporting the hot strip coil to another destination after the step of rotating the hot strip coil.

4. The method as recited in claim 3 wherein the other destination is a holding yard.

5. The method as recited in claim 2 wherein the coil car includes a set of rollers to implement the step of rotating the hot strip coil about the coil eye axis.

6. The method as recited in claim 5 wherein each roller of the set of rollers includes notches to accommodate the banding strips, thereby preventing the banding strips from being compressed between said hot strip coil and the rollers.

7. The method as recited in claim 1 wherein the step of producing a hot rolled steel sheet in a hot strip mill includes the steps of:
   providing a steel slab;
   reheating the steel slab;
   descaling the steel slab;
   edging the steel slab;
   roughing the steel slab; and
   hot rolling the steel slab to form the hot rolled steel strip.

8. The method as recited in claim 1 wherein the step of holding the hot strip coil without rotation about the coil eye axis further includes the step of:
   banding said hot strip coil with banding strips.

9. The method as recited in claim 1 wherein the first period of time is between 2 and 6 minutes.

10. The method as recited in claim 9 wherein the first period of time is between 2.5 and 4.5 minutes.

11. A method for mitigating the effects of coil collapse on hot strip mill coils without insertion of a mechanical means into the coil eye to limit sagging, the method comprising the steps of:
   producing a hot rolled steel sheet in a hot strip mill;
   forming a hot strip coil by coiling the hot rolled steel sheet around a mandrel on a downcoiler;
   orienting the hot strip coil such that the coil eye axis of the hot strip coil is in a horizontal direction;
   removing the hot strip coil from the mandrel/downcoiler;
   pre-sagging the hot strip coil to create an initial sag by allowing gravity to cause the coil to sag in a first specific direction for a first period of time, thereby causing the coil to become pre-sagged;
   without inserting a mechanical means into the coil eye to limit sagging, modifying a direction of the sag caused by the force of gravity to a direction perpendicular to the first specific direction and allowing gravity to sag the coil in the modified direction for a second period of time;
   wherein the hot strip coil being cooled enough by the end of the second period of time such that the rate of sagging of the hot strip coil has become negligible;

wherein the step of pre-sagging said hot strip coil includes the steps of:

placing the hot strip coil onto a support positioned within the coil eye, the coil hanging by the coil eye from the support;

hanging the hot strip coil, without rotation about said coil eye axis, for the first period of time, wherein said first period of time is between 1 and 6 minutes; the pre-sagging creating a maximum coil eye diameter ($D_{max}$) dimension between a top and a bottom of the hot strip coil in the direction parallel to the force of gravity.

12. The method of claim 11 wherein the step of modifying the direction of the sag caused by the force of gravity to a direction perpendicular to said first specific direction includes the steps of:

placing the bottom of the hot strip coil onto a surface; and resting the bottom of the hot strip coil on said surface for said second period of time, the second period of time lasting until the rate of sagging of said hot strip coil is negligible and the initial sag is substantially mitigated such that the coil is useable for further processing or sale without having to be recoiled.

\* \* \* \* \*